(12) United States Patent
Sugiyama et al.

(10) Patent No.: US 11,260,592 B2
(45) Date of Patent: Mar. 1, 2022

(54) 3-D PRINTING SURFACE

(71) Applicant: 3M INNOVATIVE PROPERTIES COMPANY, St. Paul, MN (US)

(72) Inventors: Naota Sugiyama, Tokyo (JP); Jiro Hattori, Atsugi (JP); Shunsuke Suzuki, Tokyo (JP); Takehiro Mitsuda, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 87 days.

(21) Appl. No.: 16/073,901

(22) PCT Filed: Feb. 7, 2017

(86) PCT No.: PCT/US2017/016816
§ 371 (c)(1),
(2) Date: Jul. 30, 2018

(87) PCT Pub. No.: WO2017/142744
PCT Pub. Date: Aug. 24, 2017

(65) Prior Publication Data
US 2019/0039305 A1 Feb. 7, 2019

Related U.S. Application Data

(60) Provisional application No. 62/296,877, filed on Feb. 18, 2016.

(51) Int. Cl.
| | | |
|---|---|---|
| *B33Y 10/00* | (2015.01) | |
| *B29C 64/245* | (2017.01) | |
| *B29C 64/106* | (2017.01) | |
| *B29C 64/20* | (2017.01) | |
| *B33Y 30/00* | (2015.01) | |
| *B33Y 70/00* | (2020.01) | |

(Continued)

(52) U.S. Cl.
CPC .......... *B29C 64/245* (2017.08); *B29C 64/106* (2017.08); *B29C 64/165* (2017.08); *B29C 64/20* (2017.08); *B33Y 10/00* (2014.12); *B33Y 30/00* (2014.12); *B33Y 70/00* (2014.12); *B29K 2033/04* (2013.01); *B29K 2055/02* (2013.01)

(58) Field of Classification Search
None
See application file for complete search history.

(56) References Cited

U.S. PATENT DOCUMENTS 4,262,072 A 4/1981 Wendling
4,885,332 A 12/1989 Bilkadi
(Continued)

FOREIGN PATENT DOCUMENTS

CA 2545903 11/2006
CN 104650587 5/2015
(Continued)

OTHER PUBLICATIONS

James, "BuildTak 3D Printing Surface", Sep. 26, 2015; Retrieved from the Internet: URL <http://3d-printing-reviews.blogspot.nl/2015/09/product-review-2-buildtak-3d-printing.html>, pp. 1-11 (XP002769802).

(Continued)

*Primary Examiner* — Armand Melendez

(57) ABSTRACT

Method of three-dimensionally printing an article onto a surface.

9 Claims, 4 Drawing Sheets

(51) Int. Cl.
  *B29C 64/165* (2017.01)
  *B29K 33/04* (2006.01)
  *B29K 55/02* (2006.01)

(56) References Cited

U.S. PATENT DOCUMENTS

| | | | |
|---|---|---|---|
| 5,104,929 A | 4/1992 | Bilkadi | |
| 5,503,785 A * | 4/1996 | Crump | B33Y 10/00 |
| | | | 264/40.7 |
| 5,633,049 A | 5/1997 | Bilkadi | |
| 5,914,162 A | 6/1999 | Bilkadi | |
| 5,939,008 A | 8/1999 | Comb | |
| 6,376,590 B2 | 4/2002 | Kolb | |
| 6,467,897 B1 | 10/2002 | Wu | |
| 7,074,463 B2 | 7/2006 | Jones | |
| 7,241,437 B2 | 7/2007 | Davidson | |
| 7,309,517 B2 | 12/2007 | Jones | |
| 2012/0021134 A1 * | 1/2012 | Kolb | B05D 3/0209 |
| | | | 427/508 |
| 2013/0302594 A1 * | 11/2013 | Sugiyama | C09D 7/62 |
| | | | 428/323 |
| 2014/0020191 A1 * | 1/2014 | Jones | A43B 23/0235 |
| | | | 12/142 R |
| 2015/0037527 A1 * | 2/2015 | Jacobs | B29C 64/40 |
| | | | 428/41.7 |
| 2017/0036403 A1 * | 2/2017 | Ruff | B33Y 30/00 |
| 2017/0129183 A1 | 5/2017 | Dufort | |
| 2017/0210077 A1 * | 7/2017 | Ermoshkin | B29C 64/245 |
| 2017/0233591 A1 * | 8/2017 | Sugiyama | C09D 7/62 |
| | | | 522/83 |
| 2018/0043617 A1 * | 2/2018 | Sugiyama | B33Y 70/00 |

FOREIGN PATENT DOCUMENTS

| | | |
|---|---|---|
| CN | 104761761 | 7/2015 |
| WO | WO 2011/139593 | 11/2011 |
| WO | WO 2012/106507 | 8/2012 |
| WO | WO 2014/022363 | 2/2014 |
| WO | WO 2015/149054 | 10/2015 |
| WO | WO 2016/137722 | 9/2016 |
| WO | WO 2016/206180 | 12/2016 |

OTHER PUBLICATIONS

Suzuki, "Verification of a Model for Estimating the Void Fraction in a Three-Component Randomly Packed Bed", Powder Technology, Jul. 15, 1985, vol. 43, No. 2, pp. 147-153.

International Search Report for PCT International Application No. PCT/US2017/016816 dated Jun. 26, 2017, 5 pages.

* cited by examiner

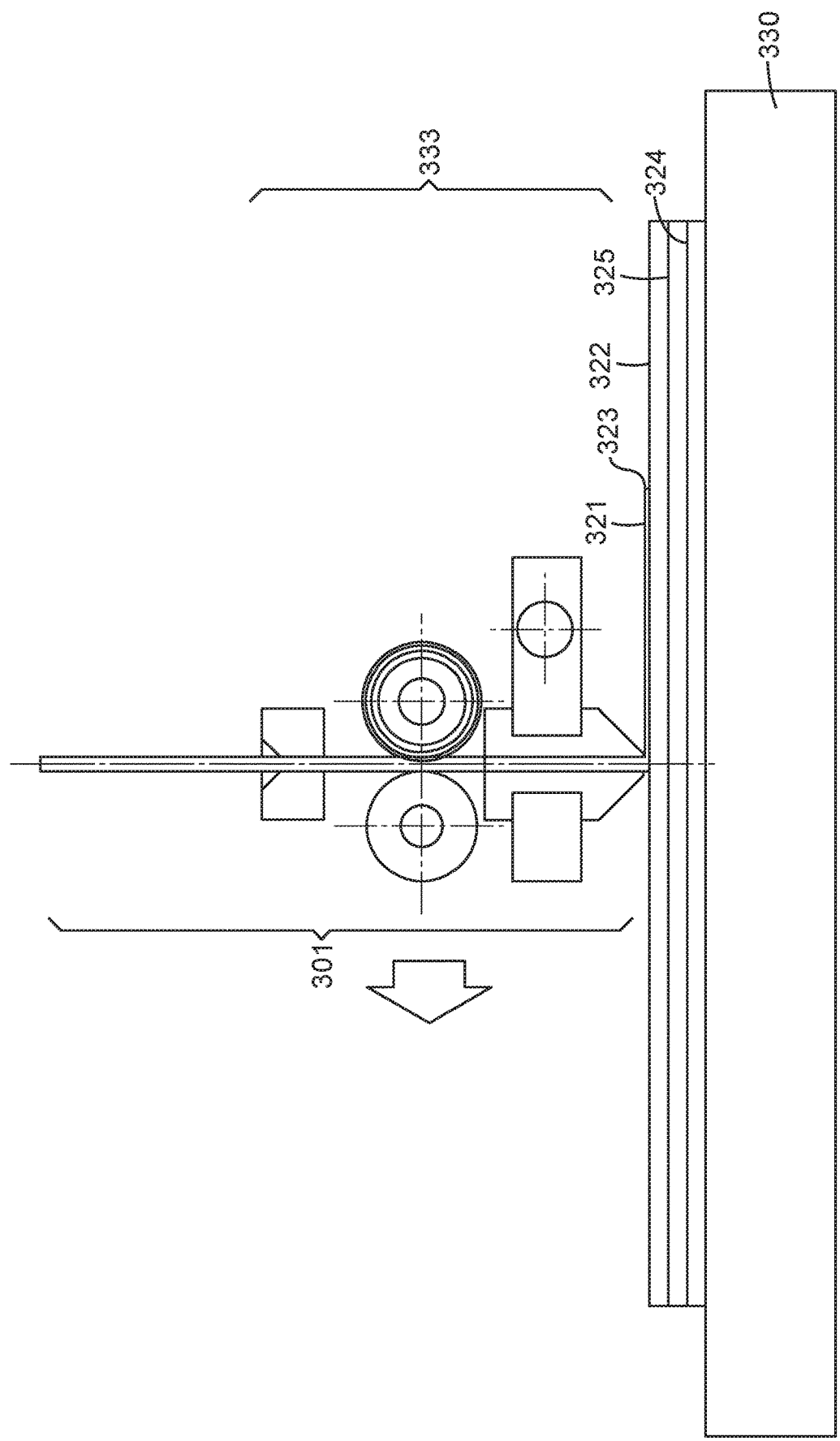

3-D PRINTING SURFACE

CROSS REFERENCE TO RELATED APPLICATIONS

This application is a national stage filing under 35 U.S.C. 371 of PCT/US2017/016816, filed Feb. 7, 2017, which claims the benefit of U.S. Provisional Application No. 62/296,877, filed Feb. 18, 2016, the disclosure of which is incorporated by reference in its/their entirety herein.

BACKGROUND

Three-dimensional ("3-D") printing technology is known in the art (see, e.g., U.S. Pat. No. 5,939,008 (Comb et al.)) and offers cost advantages and higher speed of making some articles (including prototype models) compared to, for example, conventional molding processes. In some forms of 3-D printing (e.g., that are available, for example, under the trade designation "MAKER BOT AND 3-D SYSTEMS" from Stratasys, Eden Prairie, Minn.), a plastic is extruded through a nozzle that traces a part's cross sectional geometry layer by layer. The build material is often supplied in filament form. The nozzle contains heaters that keep the plastic at a temperature just above its melting point, so that it flows easily through the nozzle and forms the layer. The temperature of molten plastic immediately drops and the viscosity increases after flowing from the nozzle and bonds to the layer below. At the starting point, the surface that the part is printed onto is often relatively cold. Therefore, the molten plastic from the extruder tip immediately hardens and often does not stick well to the (initial) printing surface. An alternative approach is to have the surface that the part is printed onto be relatively hot to aid in the deposited material sticking to the surface. Issues, however, have been encountered when the article undesirably shrinking during cooling. There can also be difficulty removing some printed articles from the printing surface.

Another approach is to mechanically contain the first writing of molten plastic by using a structured platform with the printing surface. This approach has been found to have some effectiveness in limiting delamination of the printed article from the printing surface due to thermal shrinkage. A drawback of this approach, however, is the lack of adhesion due to heat accumulation and undesirable thermal shrinkage, as well as the surface or texture imparted by the structured platform.

The useful life of the printing surface from the approaches discussed above is typically undesirably limited.

Alternative 3-D printing surfaces are desired that preferably address one or more of the undesirable aspects of the surfaces or approaches discussed above.

SUMMARY

In one aspect, the present disclosure provides a method of three-dimensionally (3-D) printing an article, the method comprising:
providing a composite material having first and second major surfaces, the composite material comprising:
a composition having first and second major surfaces (e.g., a film), the composition comprising:
(i) a binder, and
(ii) a mixture of nanoparticles in a range from 80 wt. % to 99.9 wt. % (in some embodiments, 85 wt. % to 95 wt. %), based on the total weight of the composition, wherein 10 wt. % to 50 wt. % of the nanoparticles have an average particle diameter in a range from 2 nm to 200 nm and 50 wt. % to 90 wt. % of the nanoparticles have an average particle diameter in a range from 60 nm to 400 nm, and wherein the ratio of average particle diameter of nanoparticles having an average particle diameter in the range from 2 nm to 200 nm to average particle diameter of nanoparticles having an average particle diameter in the range from 60 nm to 400 nm is in a range from 1:1 to 1:200; and
a thermoplastic layer having first and second major surfaces, wherein the second major surface of the thermoplastic layer is disposed on the first major surface of the composition; and
three-dimensionally printing the article onto the first major surface of the thermoplastic layer.

The presence of the polymeric surface has been observed to provide better printability as compared to printing on the surface of the composition comprising the binder and nanoparticles itself.

BRIEF DESCRIPTION OF THE DRAWINGS

FIG. 3B is a schematic of the exemplary 3-D printing apparatus shown in FIG. 3A.

DETAILED DESCRIPTION

Figure 1:
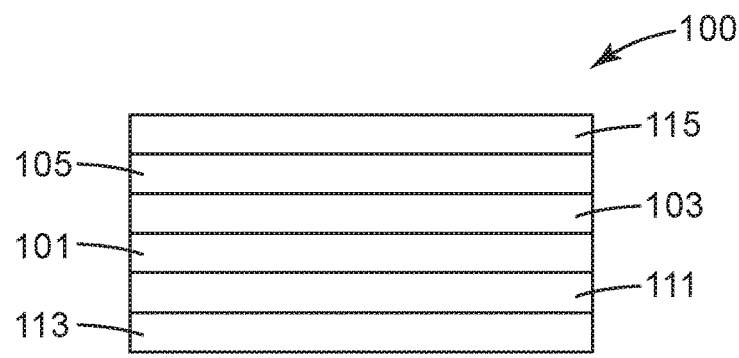
FIG. 1 is a cross-section of an exemplary article described herein for use in 3-D printing.

Referring to FIG. 1, exemplary article described herein for use in 3-D printing 100 comprises optional protective layer 115, thermoplastic layer 105, composition 103 comprising binder and nanoparticles, substrate 101, adhesive 111, and liner 113.

Figure 3A:
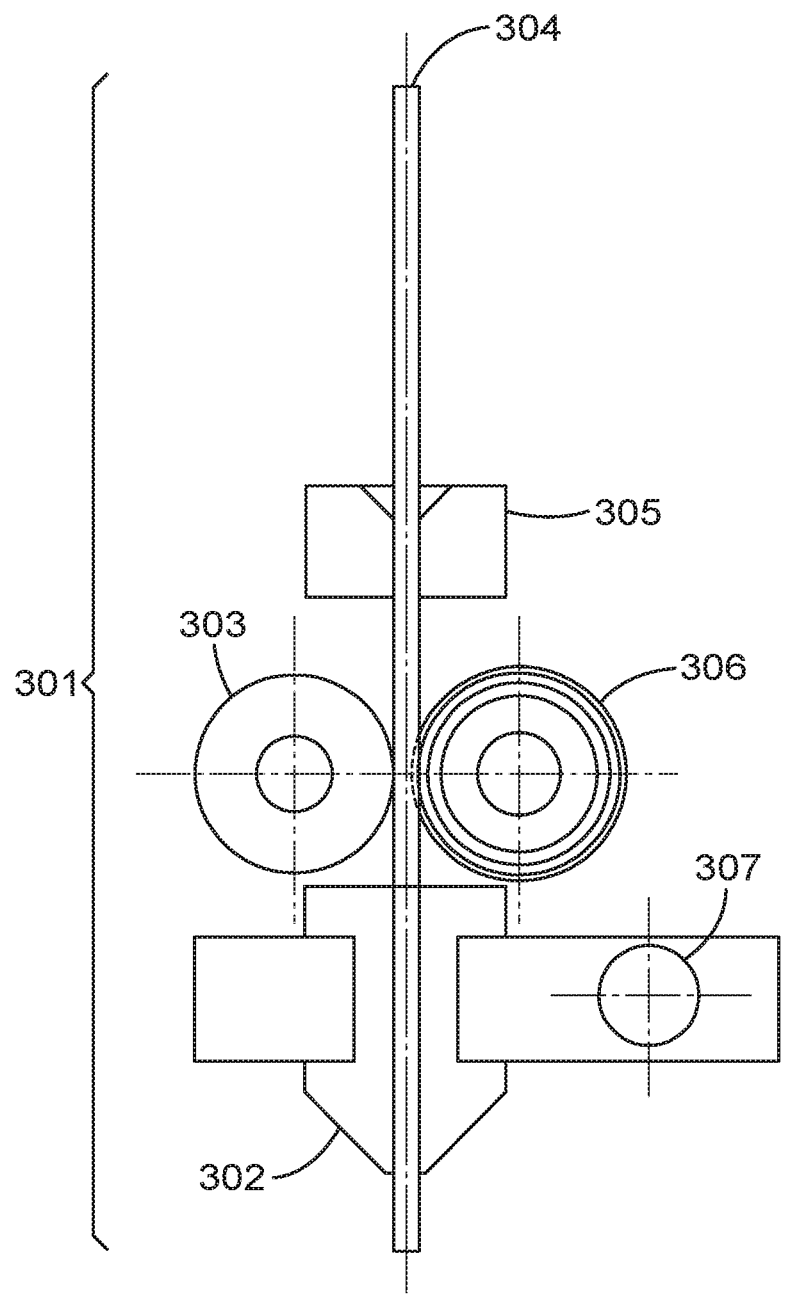
FIG. 3A is a schematic of a 3-D printing apparatus with an article printed on exemplary surface described herein.

Referring to FIGS. 3A and 3B, 3-D printing apparatus 301 with article 321 printed on exemplary surface 322. Exemplary conventional 3-D printer 301 prints polymer layer 321 on major thermoplastic surface 322 of layer 323 (comprising a thermoplastic layer and a layer comprising binder and nanoparticles) secured to substrate 325 with adhesive 324 on heatable platform 330. 3-D printing apparatus 331 has extruder die 302, filament guide die 305, filament feeding gear 306, polymer filament 304, heater 307, and backup roll 303.

Exemplary binders include resin obtained by polymerizing curable monomers/oligomers or sol-gel glass. More specific examples of resins include acrylic resins, urethane resins, epoxy resin, phenol resin, and polyvinyl alcohol. Further, curable monomers or oligomers may be selected from curable monomers or oligomers known in the art. In some embodiments, the resins include dipentaerythritol pentaacrylate (available, for example, under the trade designation "SR399" from Arkema Group, Clear Lake, Tex.), pentaerythritol triacrylate isophorone diisocyanate (IPDI) (available, for example, under the trade designation "UX5000" from Nippon Kayaku Co., Ltd., Tokyo, Japan), urethane acrylate (available, for example, under the trade designations "UV1700B" from Nippon Synthetic Chemical Industry Co., Ltd., Osaka, Japan; and "UB6300B" from Nippon Synthetic Chemical Industry Co., Ltd., Osaka, Japan), trimethyl hexane di-isocyanate/4ydroxyl ethyl acrylate (TMHDI/HEA, available, for example, under the trade designation "EB4858" from Daicel Cytech Company, Ltd., Tokyo, Japan), polyethylene oxide (PEO) modified bis-A diacrylate (available, for example, under the trade designation "R551" from Nippon Kayaku Co., Ltd., Tokyo, Japan), PEO modified bis-A epoxyacrylate (available, for example, under the trade designation "3002M" from Kyoeishia Chemical Co., Ltd., Osaka, Japan), silane based UV curable resin (available, for example, under the trade designation "SK501M" from Nagase ChemteX Corporation, Osaka, Japan), and 2-phenoxyethyl methacrylate (available, for example, under the trade designation "SR340" from Arkema Group); and the mixture thereof Use, for example, in the range from about 1.25 wt. % to about 20 wt. % of 2-phenoxyethyl methacrylate may improve adhesion to polycarbonate. Use of di-functional resins (e.g., PEO modified bis-A diacrylate ("R551") and trimethyl hexane di-isocyanate/4ydroxyl ethyl acrylate (TMHDI/HEA) (available, for example, under the trade designation "EB4858" from Daicel Cytech Company, Ltd.)), may simultaneously improve the hardness, impact resistance, and flexibility of the composition of the surface (typically in the form of a layer exhibiting the surface). In some embodiments, it may be desirable to use curable monomers or oligomers capable of forming three-dimensional structure. In some embodiments, binder is provided by curing a reactive resin (e.g., a radical reactive acrylate).

In some embodiments, the binder is provided from a mixture comprising in a range from 80 wt. % to 90 wt. % radical reactive acrylate and 20 wt. % to 10 wt. % of non-radical reactive resin, based on the total weight of the mixture. Examples of radical reactive acrylate include aliphatic urethane (available, for example, under the trade designation "EBECRYL 8701" from Daicel-Allnex, Ltd., Tokyo, Japan). Examples of non-radical reactive resin include methyl methacrylate copolymer (available, for example, under the trade designation "B44" from Dow Chemical Company, Midland, Mich.). Examples of non-radical reactive resin include cellulose acetate butyrate (available, for example, under the trade designation "CAB 381-20" from Eastman Chemical Company, Kingsport, Tenn.).

Optionally, the composition precursor further comprises crosslinking agents. Exemplary crosslinking agents include poly (meth)acryl monomers selected from the group consisting of (a) di(meth)acryl containing compounds such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated (10) bisphenol A diacrylate, ethoxylated (3) bisphenol A diacrylate, ethoxylated (30) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate, tripropylene glycol diacrylate; (b) tri(meth)acryl containing compounds such as glycerol triacrylate, trimethylolpropane triacrylate, ethoxylated triacrylates (e.g., ethoxylated (3) trimethylolpropane triacrylate, ethoxylated (6) trimethylolpropane triacrylate, ethoxylated (9) trimethylolpropane triacrylate, ethoxylated (20) trimethylolpropane triacrylate), pentaerythritol triacrylate, propoxylated triacrylates (e.g., propoxylated (3) glyceryl triacrylate, propoxylated (5.5) glyceryl triacrylate, propoxylated (3) trimethylolpropane triacrylate, propoxylated (6) trimethylolpropane triacrylate), trimethylolpropane triacrylate, tris(2-hydroxyethyl)isocyanurate triacrylate; (c) higher functionality (meth)acryl containing compounds such as ditrimethylolpropane tetraacrylate, dipentaerythritol pentaacrylate, ethoxylated (4) pentaerythritol tetraacrylate, pentaerythritol tetraacrylate, caprolactone modified dipentaerythritol hexaacrylate; (d) oligomeric (meth)acryl compounds (e.g., urethane acrylates, polyester acrylates, epoxy acrylates; polyacrylamide analogues of the foregoing; and combinations thereof). Such materials are commercially available, including at least some that are available, for example, from Arkema Group, Clear Lake, Tex.; UCB Chemicals Corporation, Smyrna, Ga.; and Aldrich Chemical Company, Milwaukee, Wis. Other useful (meth) acrylate materials include hydantoin moiety-containing poly (meth) acrylates, for example, as reported in U.S. Pat. No. 4,262,072 (Wendling et al.).

In some embodiments, a crosslinking agent comprises at least three (meth) acrylate functional groups (commercially available, for example, from Daicel-Allnex, Ltd., Tokyo, Japan; including hexafunctional aliphatic urethane acrylate, available, for example, under the trade designation "EBECRYL8301" and trifunctional aliphatic urethane acrylate, available under the trade designation "EBECRYL8701"), and tris (2-hydroxy ethyl) isocyanurate triacrylate (available, for example, under the trade designation "SR368" from Arkema Group, Clear Lake, Tex.). Further, mixtures of multifunctional and lower functional acrylates, such as a mixture of trifunctional aliphatic urethane acrylate and 1,6-hexanediol diacrylate may also be utilized. These exemplary crosslinking agents may be used as the curable monomers or oligomers.

In some embodiments, the mixture of nanoparticles present in the composition is in a range from 80 wt. % to 99.9 wt. % (in some embodiments, 85 wt. % to 95 wt. %), based on the total weight of the composition of the surface (typically in the form of a layer exhibiting the surface). The mixture of the nanoparticles includes 10 wt. % to 50 wt. % of the nanoparticles having an average particle diameter in a range from 2 nm to 200 nm (smaller particles group) and 50 wt. % to 90 wt. % of the nanoparticles having an average particle diameter in a range from 60 nm to 400 nm (larger particles group).

The average diameter of nanoparticles is measured with transmission electron microscopy (TEM) using commonly employed techniques in the art. For measuring the average particle size of nanoparticles, sol samples can be prepared for TEM imaging by placing a drop of the sol sample onto a 400 mesh copper TEM grid with an ultra-thin carbon substrate on top of a mesh of lacey carbon (available from Ted Pella, Inc., Redding, Calif.). Part of the drop can be removed by touching the side or bottom of the grid with filter paper. The remainder can be allowed to dry. This allows the particles to rest on the ultra-thin carbon substrate and to be imaged with the least interference from a substrate. Then, TEM images can be recorded at multiple locations across the grid. Enough images are recorded to allow sizing of 500 to 1000 particles. The average diameters of the nanoparticles can then be calculated based on the particle size measurements of each sample. TEM images can be obtained using a high resolution transmission electron microscope (available under the trade designation "HITACHI H-9000" from Hitachi, Tokyo, Japan) operating at 300 KV (with a LaB6 source). Images can be recorded using a camera (e.g., Model No. 895, 2 k×2 k chip, available under the trade designation "GATAN ULTRASCAN CCD" from Gatan, Inc., Pleasanton, Calif.). Images can be taken at a magnification of 50,000× and 100,000×. For some samples, images may be taken at a magnification of 300,000×.

Typically, the nanoparticles are inorganic particles. Examples of the inorganic particles include metal oxides such as alumina, tin oxides, antimony oxides, silica (SiO, $SiO_2$), zirconia, titania, ferrite, mixtures thereof, or mixed oxides thereof; metal vanadates, metal tungstates, metal phosphates, metal nitrates, metal sulphates, and metal carbides.

As used herein, "smaller particles group" means nanoparticles having an average particle diameter in the range from 2 nm to 200 nm, and "larger particles group" means nanoparticles having an average particle diameter in the range from 60 nm to 400 nm.

The average particle diameter of the smaller particles group is in the range from 2 nm to 200 nm. In some embodiments, it may be from 2 nm to 150 nm, 3 nm to 120 nm, or even 5 nm to 100 nm. The average particle diameter of the larger particles group is in the range from 60 nm to 400 nm (in some embodiments, it may be from 65 nm to 350 nm, 70 nm to 300 nm, or even 75 nm to 200 nm).

The mixture of nanoparticles includes at least two different size distributions of nanoparticles. Other than the size distribution, the nanoparticles may be the same or different (e.g., compositional, including surface modified or unmodified). In some embodiments, the ratio of average particle diameters of nanoparticles having an average particle diameter in the range from 2 nm to 200 nm to average particle diameters of nanoparticles having an average particle diameter in the range from 60 nm to 400 nm is in a range from 50 to 50, 35 to 65, or even 0.5 to 99.5. Exemplary combinations of the particle sizes include the combination of 5 nm/190 nm, 5 nm/75 nm, 5 nm/20 nm, 20 nm/75 nm, 20 nm/190 nm, and 75 nm/190 nm. By using the mixture of different sized nanoparticles, larger amount of nanoparticles can be added to the composition of the surface (typically in the form of a layer exhibiting the surface). Selection, for example, of various types, amounts, sizes, and ratios of particles may affect the transparency (including haze) and hardness.

Figure 2:
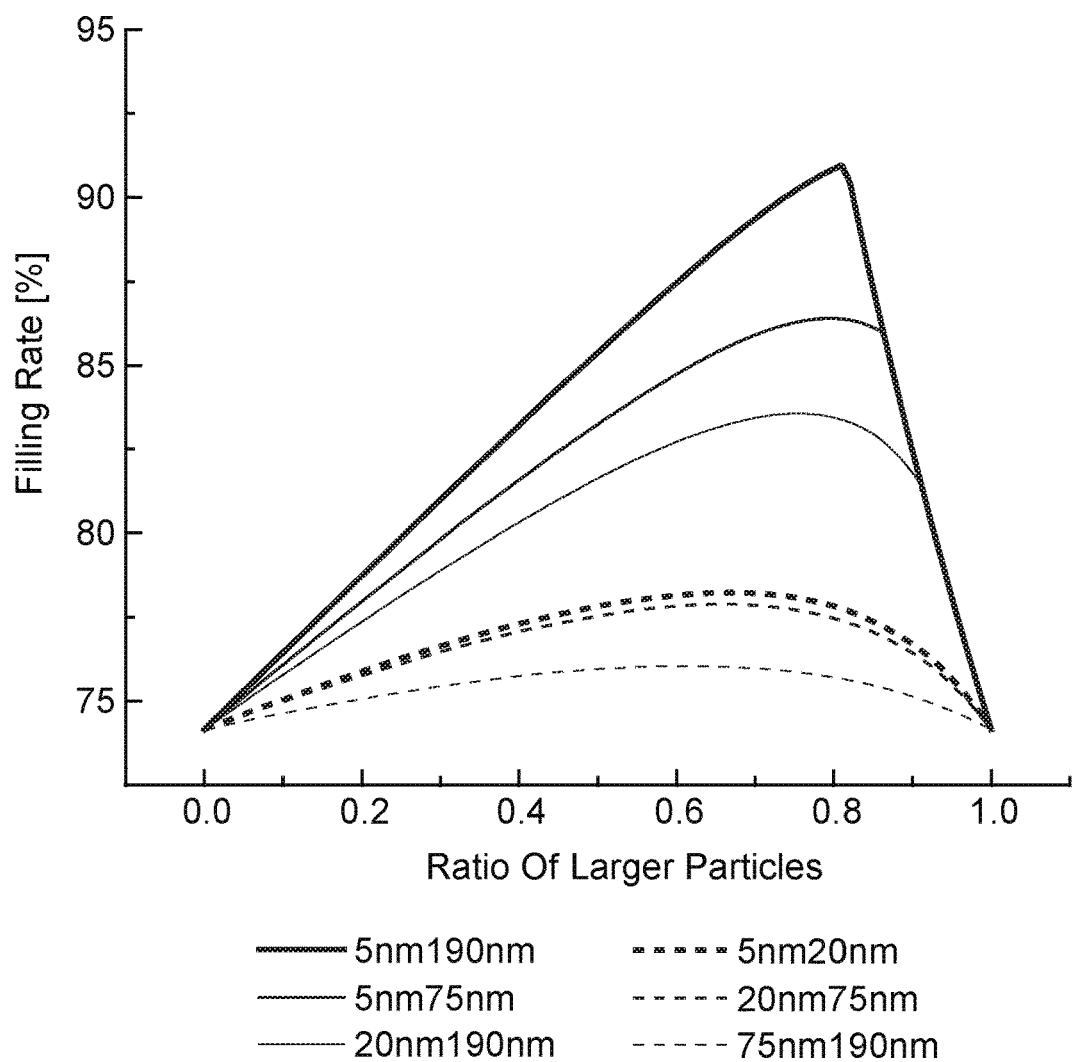
FIG. 2 is a graph that depicts the simulation result between the combination of the particle size (larger particles group/smaller particles group), and the weight ratio of the smaller particles group and the larger particles group.

The weight ratio (%) of the smaller particles group and the larger particles group can be selected depending on the particle size used or the combination of the particle size used. In some embodiments, the weight ratio is selected depending on the particle size used or the combination of the particle size used. For example, it may be selected from simulation between the combination of the particle size (larger particles group/smaller particles group), and the weight ratio of the smaller particles group and the larger particles group with software obtained under the trade designation "CALVOLD 2" (see also "Verification of a Model for Estimating the Void Fraction in a Three-Component Randomly Packed Bed," M. Suzuki and T. Oshima: *Powder Technol.*, 43, 147-153 (1985)). The simulation examples are shown in FIG. 2. From the simulation, examples of the preferable combination may be from about 45/55 to about 13/87 or from about 40/60 to about 15/85 for the combination of 5 nm/190 nm; from about 45/55 to about 10/90 or from about 35/65 to about 15/85 for the combination of 5 nm/75 nm; from about 45/55 to about 10/90 for the combination of 20 nm/190 nm; from about 50/50 to about 20/80 for the combination of 5 nm/20 nm; from about 50/50 to about 22/78 for the combination of 20 nm/75 nm; and from about 50/50 to about 27/73 for the combination of 75 nm/190 nm.

In some embodiments, a larger fill amount of nanoparticles can be incorporated into a composition for the surface by using preferable sizes and combinations of the nanoparticles, which may allow tailoring the resulting transparency and hardness of the composition of the surface (typically in the form of a layer).

Typically, the thickness of the layer comprising the binder and nanoparticles (typically in the form of a film) is in a range from thickness less than 100 micrometers (in some embodiments, less than 100 micrometers, 50 micrometers, 10 micrometers, 5 micrometers, 3 micrometers, or even less than 1 micrometers; in some embodiments, in a range from 3 micrometers to 5 micrometers, 2 micrometers to 4 micrometers, or even 1 micrometer to 3 micrometers).

Typically, by using the mixture of different sized nanoparticles, thicker and harder layers can be obtained.

Optionally, the nanoparticles may be modified with a surface treatment agent. In general, a surface treatment agent has a first end that will attach to the particle surface (covalently, ionically or through strong physisorption) and a second end that imparts compatibility of the particle with the resin and/or reacts with the resin during curing. Examples of surface treatment agents include alcohols, amines, carboxylic acids, sulfonic acids, phosphonic acids, silanes, and titanates. The desired type of treatment agent is determined, in part, by the chemical nature of the nanoparticle surface. Silanes are often preferred for silica and other siliceous fillers. Silanes and carboxylic acids are often preferred for metal oxides. The surface modification can be done either subsequent to mixing with the monomers or after mixing. When silanes are employed, reaction of the silanes with the nanoparticle surface is often preferred prior to incorporation into the binder. The required amount of surface treatment agent is dependent upon several factors such as particle size, particle type, surface treatment agent molecular weight, and surface treatment agent type. In general, it is often preferred that about a monolayer of surface treatment agent be attached to the surface of the particle. The attachment procedure or reaction conditions required also depend on the surface treatment agent used. When employing silanes, surface treatment at elevated temperatures under acidic or basic conditions, for about 1 hour to 24 hours, is often preferred. Surface treatment agents such as carboxylic acids do not usually require elevated temperatures or extended time.

Representative embodiments of surface treatment agents include compounds such as isooctyl trimethoxy-silane, N-(3-triethoxysilylpropyl) methoxyethoxyethoxyethyl carbamate, polyalkyleneoxide alkoxysilane (available, for example, under the trade designation "SILQUEST A1230" from Momentive Specialty Chemicals, Inc., Columbus, Ohio), 3-(methacryloyloxy)propyltrimethoxysilane, 3-(acryloxypropyl)trimethoxysilane, 3-(methacryloyloxy) propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate, 2-(2-methoxyethoxy)acetic acid, methoxyphenyl acetic acid, and mixtures thereof.

In some embodiments, the composition comprises about 0.1 wt. % to about 20 wt. % (in some embodiments, about 1 wt. % to about 20 wt. %, or even about 5 wt. % to about 15 wt. %) binder, based on the total weight of the composition.

The components of the composition precursor can be combined and processed as is generally known in the art. For example, the following processes may be used. Two or more different sized nanoparticles sol, with or without modification, are mixed with curable monomers and/or oligomers in solvent with an initiator, which is adjusted to a desired weight % (in solid) by adding the solvent, to furnish a composition precursor. No solvent can be used, depending on the curable monomers and/or oligomers used. The composition precursor can be coated onto the substrate by known coating processes, such as bar coating, dip coating, spin coating, capillary coating, spray coating, gravure coating, or screen printing. After drying, the coated composition (typically in the form of a film) precursor can be cured with known polymerization methods such as ultraviolet (UV) or thermal polymerization.

If the nanoparticles are surface modified, the composition precursor can be made, for example, as follows. An inhibitor and surface modification agent is added to solvent in a vessel (e.g., in a glass jar), and the resulting mixture added to an aqueous solution having the nanoparticles dispersed therein, followed by stirring. The vessel is sealed and placed in an oven, for example, at an elevated temperature (e.g., 80° C.) for several hours (e.g., 16 hours). The water is then removed from the solution by using, for example, a rotary evaporator at elevated temperature (e.g., 60° C.). A solvent is charged into the solution, and the remaining water is removed from the solution by evaporation. It may be desirable to repeat the latter a couple of times. The concentration of the nanoparticles can be adjusted to the desired weight % by adjusting the solvent level.

The composition precursor can be prepared by mixing the components of the composition using conventional techniques known in the art. The composition precursor may further include known additives such as a UV absorbing agent, a UV reflective agent, an anti-fog agent, an antistatic agent, an easy-clean agent such as an anti-finger printing agent, an anti-oil agent, an anti-lint agent, an anti-smudge agent, or other agents adding an easy-cleaning function.

Techniques for applying the composition of the surface precursor (solution) to the surface of a substrate (typically in the form of a film) are known in the art and include bar coating, dip coating, spin coating, capillary coating, spray coating, gravure coating and screen printing. Exemplary substrates include polyethylene terephthalate (PET), polymethyl methacrylate (PMMA), polycarbonate (PC), polyvinyl chloride (PVC), polypropylene (PP), acrylonitrile butadiene styrene (ABS), polyimide, triacetyl cellulose (TAC), cycloolefin polymer (COP), urethane, sheet of paper, glass, aluminum, and stainless steel. The coated composition of the surface precursor can be dried and cured by polymerization methods known in the art, including UV or thermal polymerization.

Exemplary thermoplastics include acrylonitrile styrene, acrylonitrile butadiene styrene, polylactic acid, polypropylene, polystyrene, polycarbonate, polymethyl methacrylate, and polyurethane. The thermoplastic layer can be provided onto the composition comprising binder and nanoparticles using techniques known in the art.

Typically, the thermoplastic layer thickness is at least 100 nanometers. In some embodiments, the thermoplastic layer may conform to the surface of the composition comprising the binder and nanoparticles.

In some embodiments, the first major surface of the polymeric layer has a less than 110 degree of water contact angle, as determined by the "Water Contact Angle," in the Examples, below.

In some embodiments, the first major surface of the polymeric layer has a surface roughness of at least 6 nm, as determined by atomic force microscopy, as set forth in the Examples, below.

Three-dimensional articles can be 3-D printed onto the polymeric surface using techniques known in the art.

In some embodiments, the adhesive can be an adhesive layer on the backside of the layer, which optionally may have a release liner on the adhesive. Optionally, a protective film layer can be provided on the surface for 3-D printing and then removed before use as a 3-D printing surface. Exemplary protective films include those available, for example, under trade designations "HITALEX A1310" or "HITALEX A1320" from Hitachi Chemical Co., Tokyo, Japan, or "TORETE 7111" or "TORETE 7531" from Toray Advanced Film Co., Tokyo, Japan.

In some embodiments, the article has an accuracy rating of not greater than 1, as determined by the "3-D Printing Accuracy Test," in the Examples, below.

Exemplary Embodiments

1. A method of three-dimensionally printing an article, the method comprising:
  providing a composite material having first and second major surfaces, the composite material comprising:
   a composition having first and second major surfaces (e.g., a film), the composition comprising:
    (i) a binder, and
    (ii) a mixture of nanoparticles in a range from 80 wt. % to 99.9 wt. %, based on the total weight of the composition, wherein 10 wt. % to 50 wt. % of the nanoparticles have an average particle diameter in a range from 2 nm to 200 nm and 50 wt. % to 90 wt. % of the nanoparticles have an average particle diameter in a range from 60 nm to 400 nm, and wherein the ratio of average particle diameter of nanoparticles having an average particle diameter in the range from 2 nm to 200 nm to average particle diameter of nanoparticles having an average particle diameter in the range from 60 nm to 400 nm is in a range from 1:1 to 1:200; and
   a thermoplastic layer having first and second major surfaces, wherein the second major surface of the thermoplastic layer is disposed on the first major surface of the composition; and
  three-dimensionally printing the article onto the first major surface of the thermoplastic layer.

2. The method of Exemplary Embodiment 1, wherein the nanoparticles include modified nanoparticles.

3. The method of either Exemplary Embodiment 1 or 2, wherein the mixture of nanoparticles is in a range of from 80 wt. % to 99.9 wt. %, based on the total weight of the composition.

4. The method of any preceding Exemplary Embodiment, wherein the article has an accuracy rating of not greater than 1, as determined by the 3-D Printing Accuracy Test.

5. The method of any preceding Exemplary Embodiment, wherein the first major surface of the polymeric layer has a less than 110 degree of water contact angle.

6. The method of any preceding Exemplary Embodiment, wherein the first major surface of the polymeric layer has a surface roughness of at least 6 nm, as determined by atomic force microscopy.

7. The method of any preceding Exemplary Embodiment further comprising curing reactive resin to provide the binder.

8. The method of any of Exemplary Embodiments 1 to 6 further comprising curing radical reactive acrylate to provide the binder.

9. The method of any of Exemplary Embodiments 1 to 6 further comprising curing a mixture comprising in a range from 80 wt. % to 90 wt. % radical reactive acrylate and 20 wt. % to 10 wt. % of non-radical reactive acrylate, based on the total weight of the mixture, to provide the binder.

10. The method of any of Exemplary Embodiments 7 to 9, wherein the curing includes actinic radiation.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Materials

| Material | Description | Source |
|---|---|---|
| "A-174" | 3-methacryloxypropyl-trimethoxysilane | obtained from Alfa Aesar, Ward Hill, MA, under trade designation "SILQUEST A-174" |
| "PROSTAB" | 4-hydroxy-2,2,6,6-tetramethylpiperidine 1-oxyl (5 wt. %) | obtained from Aldrich Chemical Company, Milwaukee, WI, under trade designation "PROSTAB" |
| "NALCO 2327" | 20 nm diameter $SiO_2$ sol | obtained from Nalco Company, Naperville, IL, under trade designation "NALCO 2327" |
| "NALCO 2329" | 75 nm diameter $SiO_2$ sol | obtained from Nalco Company under trade designation "NALCO 2329" |
| "EBECRYL 8701" | trifunctional aliphatic urethane acrylate | obtained from Daicel-Allnex, Ltd., Tokyo, Japan, under trade designation "EBECRYL 8701" |
| "SR238" | 1,6-hexanediol diacrylate | obtained from Arkema Group, Clear Lake, TX, under trade designation "SR238" |
| "PARALOID B-44" | thermoplastic acrylic resin | obtained from Dow Chemical Company, Midland, MI, under trade designation "PARALOID B-44" |
| "CAB 381-2" | cellulose acetate butyrate | obtained from Eastman Chemical Company, Kingsport, TN, under trade designation "CAB 381-2" |
| "ESACURE ONE" | difunctional alpha hydroxyketone | obtained from Lamberti, Gallarate, Italy, under trade designation "ESACURE ONE" |
| 1-methoxy-2-propanol | solvent | obtained from Aldrich Chemical Company, Milwaukee, WI |
| Methyl ethyl ketone | solvent | obtained from Aldrich Chemical Company, Milwaukee, WI |
| "CEVIAN-N 050SF" | acrylonitrile styrene | obtained from Daicel Polymer Ltd., Tokyo, Japan, under trade designation "CEVIAN-N 050SF" |
| "COSMOSHINE A4100" | polyethylene terephthalate (PET) film | obtained from TOYOBO, LTD., Osaka, Japan, under trade designation "COSMOSHINE A4100" |

Methods

Method for Fabrication of Modeling Article for Evaluation of 3-D Printability

Figure 4:
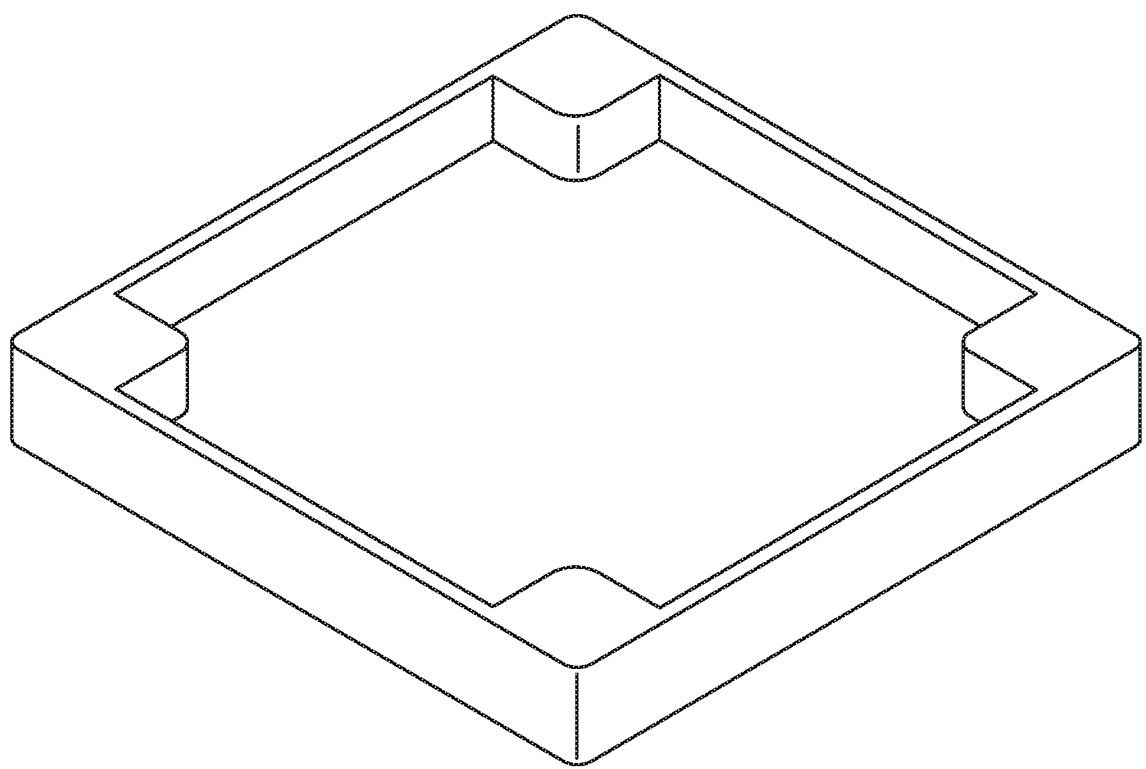
FIG. 4 is a schematic of a computer-aided designed (CAD) article to be 3-D printed.

An adhesive tape (obtained from 3M Company, St. Paul, Minn., under trade designation "3M POLYESTER DOUBLE COATED TAPE ST-416P") was laminated on the back side of a 3-D printing substrate. The 3-D printing substrate had the front side of a 3-D printing surface prepared according to the Examples and Comparative Examples described below. This 3-D printing substrate, with the adhesive tape on the back, was applied onto a 3-D printer stage using a silicon rubber roll. The original model design to be 3-D printed was designed using Computer-Aided Design (CAD) software (obtained under the Trade designation "AUTODESK INVENTOR 2013"). The CAD designed article to be 3-D printed was a square-shaped tray having side walls and corners as shown schematically in FIG. 4.

Acrylonitrile-butadiene-styrene (ABS) fibers (1.8 mm diameter; white color; obtained under trade designation "3D PRINTER FILAMENT" from Zhejiang Flashforge 3D Technology Co., Ltd., Jinhua, China) were used to 3-D print parts using a 3-D Printer (obtained under the trade designation "FLASHFORGE DREAMER" from FlashForgeUSA, City of Industry, Calif.). Printing conditions were:

Slice engine: Slic3r
Number of printhead: 2
Print resolution: Intermediate
Layer height: 0.20 mm
First layer height: 0.30 mm Frame thickness: 3 layer
Packing density: 25%
Filling pattern: line
Print speed: 60 mm/sec.
Head speed: 80 mm/sec.
Head temp: 220° C.
Platform temp: 80° C., 60° C.
Cooling fan control: auto Method for Determining Accuracy of 3-D Printing ("3-D Printing Accuracy Test")

Accuracy of 3-D printing was evaluated by determining the warpage at each corner of the 3-D printed article and assigning a warpage rating. The warpage was rated as according to the designations in Table 1, below.

TABLE 1

| Observation | Rating |
| --- | --- |
| No warpage at any corner | 0 |
| Warpage at each corner is less than 0.1 mm | 1 |
| Warpage at each corner is from 0.1 mm to 0.2 mm | 2 |
| Large warpage at each corner ranges from 0.2 mm to 1.0 mm | 3 |
| Article was not fixed on the 3-D printing surface | 4 |

Method for Determining Release Ability of Fabricated 3-D Article from the 3-D Printing Surface Release ability of fabricated 3-D articles from the 3-D printing surfaces were evaluated (i.e., rated) using the designations in Table 2, below.

TABLE 2

| | |
| --- | --- |
| Good | Easy release by hand |
| Heavy | Difficult to release by hand but possible using a tool |
| Article Break | Extremely difficult to release, even using a tool, and article broken |

In addition, after releasing the 3-D printed articles from the 3-D printing surface, presence or absence of delamination of the 3-D printing surface from its substrate was determined by using an optical microscope.

Method for Determining Adhesion of 3-D Printing Surface on its Substrate

Adhesion of the 3-D printing surface to its substrate for samples prepared according to the Examples and Comparative Examples, was evaluated by cross-cut test according to JIS K5600 (April 1999), the disclosure of which is incorporated herein by reference, where a 5×5 grid with 1 mm of intervals (i.e., 25 one mm by one mm squares) and tape (obtained under the trade designation "NICHIBAN" from Nitto Denko Co., Ltd., Osaka, Japan) were used.

Method for Determining Optical Properties

Optical properties such as clarity, haze and percent transmittance (TT) of the 3-D printing surface samples, prepared according to the Examples and Comparative Examples, were measured using a haze meter (obtained under the trade designation "NDH5000W" from Nippon Denshoku Industries, Co., Ltd., Tokyo, Japan). Optical properties were determined on as-prepared samples (i.e., initial optical properties) and after subjecting the samples to steel wool abrasion resistance testing. The "Haze Test" compared the difference in haze values before and after subjecting the samples to steel wool abrasion resistance testing.

Method for Determining Water Contact Angle ("Water Contact Angle Test")

Water contact angle of the 3-D printing surface was measured by sessile drop method using a contact angle meter (obtained under the trade designation "DROPMASTER FACE" from Kyowa Interface Science Co., Ltd., Saitama, Japan). The value of contact angle was calculated from the average of 5 measurements.

Preparation of Surface Modified Silica Sol (Sol-1)

25.25 grams of 3-methacryloxypropyl-trimethoxysilane ("A-174") and 0.5 gram of 4-hydroxy-2,2,6,6-tetramethylpiperidine 1-oxyl (5 wt. %; "PROSTAB") was added to a mixture of 400 grams of 20 nm diameter $SiO_2$ sol ("NALCO 2327") and 450 grams of 1-methoxy-2-propanol in a glass jar with stirring at room temperature for 10 minutes. The jar was sealed and placed in an oven at 80° C. for 16 hours. The water was removed from the resultant solution with a rotary evaporator at 60° C. until the solid content of the solution was close to 45 wt. %. 200 grams of 1-methoxy-2-propanol was charged into the resultant solution, and the remaining water was removed by using the rotary evaporator at 60° C. This latter step was repeated for a second time to further remove water from the solution. The concentration of total $SiO_2$ nanoparticles was then adjusted to 45.5 wt. % by adding 1-methoxy-2-propanol to result in a $SiO_2$ sol containing surface modified $SiO_2$ nanoparticles with an average size of 20 nm.

Preparation of Surface Modified Silica Sol (Sol-2)

5.95 grams of 3-methacryloxypropyl-trimethoxysilane ("A-174") and 0.5 gram of 4-hydroxy-2,2,6,6-tetramethylpiperidine 1-oxyl (5 wt. %; "PROSTAB") was added to a mixture of 400 grams of 75 nm diameter $SiO_2$ sol ("NALCO 2329") and 450 grams of 1-methoxy-2-propanol in a glass jar with stirring at room temperature for 10 minutes. The jar was sealed and placed in an oven at 80° C. for 16 hours. The water was removed from the resultant solution with a rotary evaporator at 60° C. until the solid content of the solution was close to 45 wt. %. 200 grams of 1-methoxy-2-propanol was charged into the resultant solution, and the remaining water was removed by using the rotary evaporator at 60° C. This latter step was repeated for a second time to further remove water from the solution. The concentration of total $SiO_2$ nanoparticles was adjusted to 45.5 wt. % by adding 1-methoxy-2-propanol to result in a $SiO_2$ sol containing surface modified $SiO_2$ nanoparticles with an average size of 75 nm.

Preparation of Nanoporous Coating Precursor (NPC-1)

708.78 grams of Sol-1, 1355.35 grams of Sol-2, 118.13 grams of trifunctional aliphatic urethane acrylate "EBECRYL 8701," 33.75 grams of 1,6-hexanediol diacrylate "SR238," and 16.88 grams of cellulose acetate butyrate ("CAB 381-2") were mixed. 11.25 grams of difunctional alpha hydroxyketone ("ESACURE ONE") was added as the photoinitiator. The mixture was adjusted to 45.0 wt. % solids by adding 281.12 grams of 1-methoxy-2-propanol, to provide nanoporous precursor solution NPC-1.

Method for Fabrication of Nanoporous Layer on PET Film (Nanoporous Layer Film-1)

To prepare Nanoporous Layer Film-1, a 100 micrometers-thick PET film ("COSMOSHINE A4100") was used as substrate. NPC-1 was coated on the PET film using the SD gravure coating method. The coating conditions used were 200 line-120% wiping ratio. A filter (obtained under the trade designation "HT-40EY ROKI" from Roki Co., Ltd., Shizuoka, Japan) was used for in-line filtering. The temperatures in the three zones of the oven were set at 87° C., 85° C., and 88° C., respectively (actual temperature of 59° C./67° C./67° C., respectively) which were equipped with 30/40/40 Hz oven fans. Line speed and UV power were fixed 6 meters per minute and 80%, respectively. The oven atmosphere was purged with $N_2$ gas (with 120-240 ppm of $O_2$). Web tension was 20/24/19/20 N (for 250 mm web) at Unwind (UW)/Input/Oven/Wind, respectively. The unwinder and winder were 3 inches (7.5 cm) in core diameter.

Preparation of Thermoplastic Precursor Solution (TPC-1)

TPC-1 was prepared by adding 10 grams of thermoplastic acrylic resin ("PARALOID B44") into 90 grams of methyl ethyl ketone and then stirring the mixture until the resin dissolved.

could not be fixed on the surfaces at either a platform temperature of 80° C. or 60° C. On the other hand, 3-D molded ABS articles were successfully fabricated on the 3-D printing surfaces of EX-1 to EX-4 at either a platform temperature of 80° C. or 60° C.

3-D molded articles of CE-A to CE-B and EX-1 to EX-4 were evaluated using the test methods described above. Table 3, below, summarizes the evaluation results of 3-D printability for ABS for each of CE-A to CE-B and EX-1 to EX-4.

TABLE 3

| Example | 3-D Printing Ability for ABS at 80° C. | | | 3-D Printing Ability for ABS at 60° C. | | | Initial Optical Properties | | Cross Cut Adhesion | $H_2O$ Contact Angle (degrees) |
|---|---|---|---|---|---|---|---|---|---|---|
| | Accuracy Rating | Release Ability | Delamination | Accuracy Rating | Release Ability | Delamination | TT | Haze | | |
| CE-A | 4 | N/A* | N/A* | 4 | N/A* | N/A* | 89.46 | 0.91 | 25/25 | 74.1 |
| CE-B | 4 | N/A* | N/A* | 4 | N/A* | N/A* | 90.60 | 13.97 | 25/25 | 89.2 |
| EX-1 | 0 | Good | No delamination | 3 | Good | No delamination | 88.44 | 13.85 | 25/25 | 74.5 |
| EX-2 | 1 | Good | No delamination | 3 | Good | No delamination | 88.07 | 14.16 | 25/25 | 71.5 |
| EX-3 | 0 | Good | No delamination | 3 | Good | No delamination | 88.51 | 13.39 | 25/25 | 87.8 |
| EX-4 | 0 | Good | No delamination | 3 | Good | No delamination | 88.79 | 7.22 | 25/25 | 79.1 |

*N/A means not applicable. For these samples, ABS thermoplastic could not be fixed on the surface.

Preparation of Thermoplastic Precursor Solution (TPC-2)

TPC-2 was prepared by adding 10 grams of thermoplastic acrylonitrile styrene ("CEVIAN-N 050SF") into 90 grams of methyl ethyl ketone and then stirring the mixture until the resin dissolved.

Method for Fabrication of Thermoplastic Layer on the Nanoporous Layer Film-1

The Nanoporous Layer Film-1 prepared as described above was fixed on a glass table with level adjustment, and then a thermoplastic precursor solution (TPC-1 or TPC-2) was coated on the Nanoporous Layer Film-1 using a Mayer Rod #4, 8 and 16, as desired. The coated Nanoporous Layer Film-1 was dried at 100° C. for 10 minutes in air.

Comparative Examples A to B (CE-A to CE-B) and Examples 1-4 (EX-1 to EX-4)

CE-A was prepared by using a bare polyethylene terephthalate (PET) film ("COSMOSHINE A4100") with a thickness of 100 micrometers as a 3-D printing surface.

CE-B was prepared by using the Nanoporous Layer Film-1 prepared as described above as a 3-D printing surface without further coatings.

3-D printing surfaces of EX-1 and EX-2 were prepared by coating the Nanoporous Layer Film-1 prepared as described above with TPC-1 using Mayer Rod #16 and 4, respectively as described above in "Method for Fabrication of Thermoplastic Layer on the Nanoporous Layer Film-1" as described above.

3-D printing surfaces of EX-3 and EX-4 were prepared by coating the Nanoporous Layer Film-1 prepared as described above with TPC-2 using Mayer Rod #16 and 8, respectively as described above in "Method for Fabrication of Thermoplastic Layer on the Nanoporous Layer Film-1" as described above.

The 3-D printing surfaces of CE-A, CE-B, and EX-1 to EX-4 were 3-D printed using the "Method for Fabrication of Modeling Article for Evaluation of 3-D printability" as described above, using a platform temperatures of 80° C. and 60° C.

3-D molded articles could not be fabricated on 3-D printing surfaces of CE-A to CE-B, as ABS thermoplastic Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A method of three-dimensionally printing an article, the method comprising:
    providing a composite material having first and second major surfaces, the composite material comprising:
        a nanoporous composition having first and second major surfaces, the nanoporous composition comprising:
            (i) a binder, and
            (ii) a mixture of nanoparticles in a range from 80 wt. % to 99.9 wt. %, based on the total weight of the composition, wherein 10 wt. % to 50 wt. % of the nanoparticles have an average particle diameter in a range from 2 nm to 200 nm and 50 wt. % to 90 wt. % of the nanoparticles have an average particle diameter in a range from 60 nm to 400 nm, and wherein the ratio of average particle diameter of nanoparticles having an average particle diameter in the range from 2 nm to 200 nm to average particle diameter of nanoparticles having an average particle diameter in the range from 60 nm to 400 nm is in a range from 1:1 to 1:200; and
        a thermoplastic layer having first and second major surfaces, wherein the second major surface of the thermoplastic layer is disposed on the first major surface of the nanoporous composition; and
    three-dimensionally printing the article onto the first major surface of the thermoplastic layer.

2. The method of claim 1, wherein the nanoparticles include modified nanoparticles.

3. The method of claim 1, wherein the article has an accuracy rating of not greater than 1, as determined by the 3-D Printing Accuracy Test.

4. The method of claim 1, wherein the first major surface of the thermoplastic layer has a less than 110 degree of water contact angle.

5. The method of claim 1, wherein the first major surface of the thermoplastic layer has a surface roughness of at least 6 nm, as determined by atomic force microscopy.

6. The method of claim 1 further comprising curing reactive resin to provide the binder.

7. The method of claim 1 further comprising curing radical reactive acrylate to provide the binder.

8. The method of claim 1 further comprising curing a mixture comprising in a range from 80 wt. % to 90 wt. % radical reactive acrylate and 20 wt. % to 10 wt. % of non-radical reactive acrylate, based on the total weight of the mixture, to provide the binder.

9. The method of claim 6, wherein the curing includes actinic radiation.

* * * * *